United States Patent
Sayer (10) Patent No.: US 10,648,821 B2
(45) Date of Patent: May 12, 2020

(54) SYSTEMS AND METHODOLOGIES FOR ROUTE PLANNING

(71) Applicant: TOYOTA MOTOR ENGINEERING & MANUFACTURING NORTH AMERICA, INC., Erlanger, KY (US)

(72) Inventor: Tina Brunetti Sayer, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/488,992

(22) Filed: Apr. 17, 2017

(65) Prior Publication Data

US 2018/0299276 A1 Oct. 18, 2018

(51) Int. Cl.
*G01C 21/34* (2006.01)

(52) U.S. Cl.
CPC ..... *G01C 21/3415* (2013.01); *G01C 21/3453* (2013.01); *G01C 21/3461* (2013.01)

(58) Field of Classification Search
CPC ............ G01C 21/3415; G01C 21/3453; G01C 21/3461
USPC ......................................................... 701/411
See application file for complete search history.

(56) References Cited

U.S. PATENT DOCUMENTS

| | | | |
|---|---|---|---|
| 6,813,582 B2 * | 11/2004 | Levi | G01C 21/12 701/495 |
| 7,003,122 B2 * | 2/2006 | Chen | A61B 5/02438 381/67 |
| 7,254,516 B2 * | 8/2007 | Case, Jr. | A63B 24/0062 702/182 |
| 8,352,179 B2 | 1/2013 | French et al. | |
| 9,043,133 B2 | 5/2015 | Rosario | |
| 9,291,470 B2 | 3/2016 | Shin et al. | |
| 9,493,130 B2 * | 11/2016 | Penilla | H04L 67/12 |
| 9,633,660 B2 * | 4/2017 | Haughay | G10L 15/22 |
| 9,672,823 B2 * | 6/2017 | Penilla | G10L 15/22 |
| 9,945,679 B2 * | 4/2018 | Bender | G01C 21/34 |
| 10,049,668 B2 * | 8/2018 | Huang | G10L 15/285 |
| 2002/0027524 A1 * | 3/2002 | Pippin | A63B 71/0622 342/357.34 |
| 2002/0091796 A1 * | 7/2002 | Higginson | A61B 5/0002 709/218 |
| 2002/0173407 A1 * | 11/2002 | Bowman | A63B 24/0062 482/8 |

(Continued)

FOREIGN PATENT DOCUMENTS

| | | |
|---|---|---|
| JP | 2008-68664 | 3/2008 |
| JP | 2013156152 A * | 8/2013 |

(Continued)

*Primary Examiner* — Tuan C To (74) *Attorney, Agent, or Firm* — Oblon McClelland, Maier & Neustadt, L.L.P.

(57) ABSTRACT

Systems and methods for route planning. The method includes acquiring, using processing circuitry, travel information. The travel information includes a user destination. Further, the method includes determining, using the processing circuitry, an emotional state of a user based on at least one of a plurality of factors, determining a route plan based on the user destination and the emotional state of the user; and control an aspect of the vehicle based on the route plan.

19 Claims, 5 Drawing Sheets

(56) References Cited

U.S. PATENT DOCUMENTS

| | | | |
|---|---|---|---|
| 2004/0224718 A1* | 11/2004 | Chen | A61B 5/0002 455/553.1 |
| 2005/0209050 A1* | 9/2005 | Bartels | A63B 24/0084 482/8 |
| 2006/0084551 A1* | 4/2006 | Volpe, Jr. | A63B 71/0686 482/8 |
| 2006/0189437 A1* | 8/2006 | Cohen | G09B 7/02 482/7 |
| 2008/0077489 A1* | 3/2008 | Gilley | G06Q 30/02 705/14.11 |
| 2009/0164219 A1* | 6/2009 | Yeung | G04C 3/002 704/258 |
| 2011/0059769 A1* | 3/2011 | Brunolli | G08C 17/02 455/556.1 |
| 2014/0046595 A1* | 2/2014 | Segawa | G01C 21/34 701/541 |
| 2014/0107919 A1* | 4/2014 | Venkatraman | G01S 19/48 701/466 |
| 2014/0129175 A1* | 5/2014 | Poduri | H04W 4/029 702/141 |
| 2015/0081210 A1 | 3/2015 | Yeh et al. | |
| 2015/0232097 A1* | 8/2015 | Luther | B61L 3/006 701/123 |
| 2015/0243172 A1 | 8/2015 | Eskilson | |
| 2015/0260531 A1 | 9/2015 | Ehsani et al. | |
| 2015/0276419 A1* | 10/2015 | Hashem | G01C 21/20 701/425 |
| 2015/0300831 A1 | 10/2015 | Sernicola | |
| 2015/0345981 A1 | 12/2015 | Goldman-Shenhar et al. | |
| 2016/0091337 A1 | 3/2016 | Weast et al. | |
| 2016/0195602 A1* | 7/2016 | Meadow | G01S 5/10 701/517 |
| 2016/0318468 A1* | 11/2016 | Ricci | H04W 4/21 |
| 2017/0030726 A1* | 2/2017 | French | G01C 21/3461 |
| 2018/0257682 A1* | 9/2018 | Brooks | B61L 3/006 |
| 2018/0274927 A1* | 9/2018 | Epperlein | G01C 21/005 |

FOREIGN PATENT DOCUMENTS

| | | |
|---|---|---|
| JP | 2015-128989 | 7/2015 |
| KR | 20100062856 A * | 6/2010 |

* cited by examiner

SYSTEMS AND METHODOLOGIES FOR ROUTE PLANNING

BACKGROUND

Navigation systems have become widely used by private citizens and corporations in their vehicle and/or cellular telephones. U.S. Pat. No. 8,352,179 B2 entitled "Human emotion metrics for navigation plans and maps" by French et al. describes methods for enhanced navigation route and destination planning based on human emotion metrics.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

According to an embodiment of the present disclosure, there is provided a method for route planning based on the emotional state of a driver. The method includes acquiring, using processing circuitry, travel information. The travel information includes a user destination. Further, the method includes determining, using the processing circuitry, an emotional state of a user based on at least one of a plurality of factors, determining a route plan based on the user destination and the emotional state of the user; and controlling an aspect of the vehicle based on the route plan.

According to an embodiment of the present disclosure, there is provided a system, including circuitry and one or more sensors. The circuitry is configured to acquire travel information. The travel information includes a user destination. The circuitry is further configured to determine an emotional state of a user based on at least one of a plurality of factors. The plurality of factors includes readings from the one or more sensors. Further, the circuitry is configured to determine a route plan based on the user destination and the emotional state of the user, and control an aspect of the vehicle based on the route plan.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Referring now to the drawings, wherein like reference numerals designate identical or corresponding parts throughout several views, the following description relates to a system and associated methodology for providing a route plan to a user based on the user's emotional state. For example, the system adjusts a departure time based on the user's emotional state. The user's emotional state may be determined based on a plurality of factors such as stress, time pressure, anger, blood pressure, heart rate, and respiration.

Current route and trip planning techniques may take into a multitude of factors such as current traffic, weather, time of day, and the like when determining a suggested route and/or time of arrival. The multitude of factors can also be taken into account to tell a driver when they need to leave so that the driver reaches an intended destination on time. However, none of the current techniques takes into account a driver's emotional state when determining the suggested route and/or a suggested departure time.

The system and associated methodology described herein provide a route planner that takes into account a user's emotional state when configuring a route plan. This provides the advantage for the user to be more timely and/or relaxed while traveling to and arriving at the destination.

The route planner can be implemented on a portable device (e.g., cell phone), a dedicated trip planning device, or can be implemented directly into a vehicle. In one aspect, when the user's stress is high, the route planner can recommend that the trip start earlier (i.e., to relieve stress of being late) and/or take a different route in order to try to prevent additional stress. The emotional state of the user may be determined based on one or more of the following factors: stress (e.g., sensors look at Galvanic skin response, heart rate, pupil diameter and respiration to identify high stress and low stress), time pressure (could be inferred from a calendar schedule), and self-reported feelings of stress. Depending on how busy, stressed, and/or angry a person is, the factors change when the person should leave to reach their destination and/or the route they take. The route planner can retrieve information from the user's calendar that indicates where the person is going and what time he/she needs to be there. Traffic and environmental information (e.g., weather) can be used in addition to the emotional state of the user.

Figure 1:
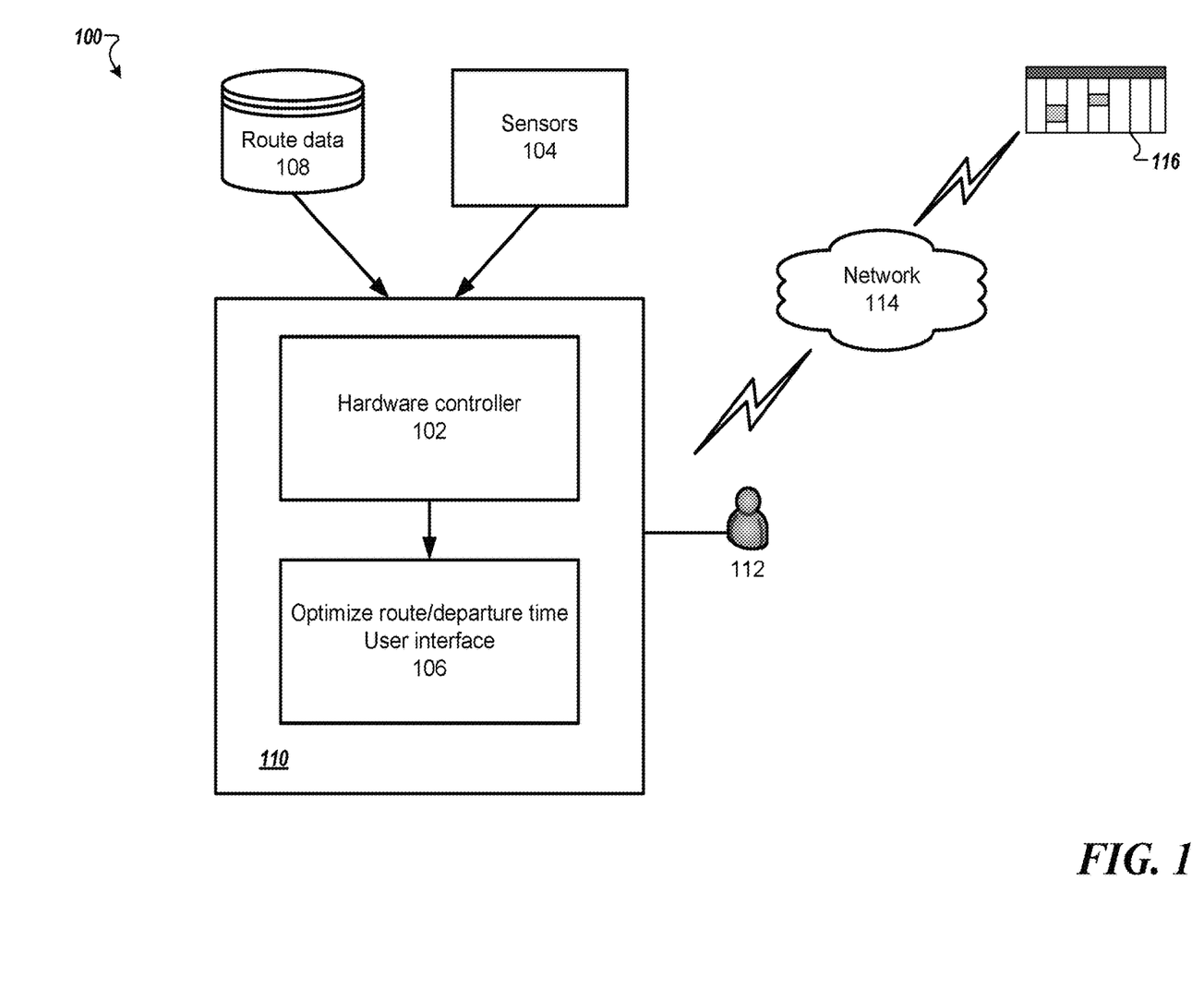
FIG. 1 is a block diagram representation of a system for providing a route plan to a user according to one example.

FIG. 1 is a block diagram representation for a system 100 for providing a route plan to a user (e.g., driver, passenger, cyclist) 112 according to one example. The system 100 may include a hardware controller 102, one or more sensors 104, a user interface 106, a route data database 108, and a network 114. The route plan may be generated based on travel information (e.g., destination, starting location). The travel information may be received from the user 112 or automatically retrieved from an electronic calendar 116 associated with the user 112 via the network 114.

The system 100 may be applied for people travelling on foot, driving, boating, flying, or sailing. The controller 102 and the user interface 106 may be a part of a user device 110 such as a smartphone or a Global Positioning System (GPS) device. The controller 102 and/or the user interface 106 may be included in the dashboard of a vehicle.

The system 100 can include a server that receives a request for route planning from one or more user devices 110 via the network 114. The network 114 can represent one or more networks connecting the route data database 108, the one or more sensors 104, and the user device 110. The route data database 108 can represent one or more databases connected to the user device 110 via the network 114.

The network 114 can be a public network, such as the Internet, or a private network such as an LAN or WAN network, or any combination thereof and can also include PSTN or ISDN sub-networks. The network 114 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The emotional state of the driver can be determined based on measurements collected using the one or more sensors 104. Additionally, or alternatively, the emotional state may be determined based on a person's self-rating as described further below. The one or more sensors 104 may transmit the measurements to the controller 102 via the network 114.

The emotional state may include any emotion-related indicator about the user, such as happy, sad, anger, frustration, pleasure, contentment, joy, sorrow, fear, hate, irritation, anticipation, and rage.

The one or more sensors 104 may be included in a portable device used/worn by the user 112. For example, the sensor may be a sensor that is included in one or more of a wristband, necklace, and earrings of the user 112. In one aspect, the one or more sensors 104 may be included in a vehicle. For example, the sensor may be a sensor that is included in one or more of the steering wheel, driver's seat, passenger seat, transmission, ceiling, and windshield of the vehicle.

The one or more sensors 104 may include a bio signal sensor, a voice signal sensor, and an environmental sensor. The one or more sensors 104 are configured to measure one or several of the following physical parameters of the user, for example systolic blood pressure, diastolic blood pressure, pulse, heart rate, cardiac minute volume, vascular resistance, respiratory volume, respiratory rate, body temperature, skin temperature, blood adrenalin level, blood cortisol level, blood noradrenalin level, blood glucose level, transpiration volume, amount of hand sweat exuded, electrical conductivity of the skin, eye movement, dilated nostrils, lip pursing, muscular tension, body movement, speech volume, voice strength, facial expression, and/or pupil size of the user 112. The system 100 can further comprise a plurality of separate sensors. Each sensor may measure one or more of the physical parameters of the user 112 and send them to the controller 102 over a wireless or wired connection via the network 114.

The controller 102 may determine a stress level of the user 112. The stress level is determined based on at least one physical parameter of the user. For example, the controller 102 may compare a received measurement (e.g., from sensors 104) to a limit value, by detecting the magnitude of a change between the two measured values, and/or by detecting the rate of change between two measured values.

For example, the physical parameter may be the heart rate of the user. The measured heart rate of the user, which can be, for example, 72 beats per minute, can then be compared with a limit value that can be predetermined, or configurable to, for example 85. The limit value can also be adapted for each user and be at, for example, 10% above the resting heart rate of the user. When the heart rate of the user in this example falls below the limit value, the user can be characterized as harmonious, or under-stressed. When the stress level falls below a limit value, the controller 102 may not modify an ordinary route plan. For example, the ordinary route plan may be generated by a commercially available route planner such as Google Map™.

However, when the heart rate of the user exceeds 85 beats per minute, the user can be categorized as stressed, which can in turn trigger a modification of the route plan.

The controller 102 may track changes in one or more physical parameters. For example, the controller 102 may determine the stress level based on changes in the heart rate of the user 112. Assume that the heart rate of the user 112 is 72 beats per minute on a first measurement occasion and 85 beats per minute on a second measurement occasion. The pulse increase is then 85−72=13 beats per minute, which value can be compared to a limit value that can be, for example, 7 beats per minute or, for example, 10% of the original value (i.e. of 72).

Furthermore, in one aspect, the physical parameter can consist of the change in the heart rate of the user per unit of time. Assume that the heart rate of the user is 72 beats per minute on a first measurement occasion and 85 beats per minute on a second measurement occasion that occurs one minute later. The heart rate change per minute is then 85−72=13 beats per minute, which value can be compared to a limit value that can, for example, be 7 beats per minute or, for example, 10% of the original value (i.e. of 72).

The limit value, average value, and normal value may be predetermined for each user. The normal value of the physical parameter may be determined when a user input indicates that the user is not stressed, for example, through the user interface 106.

In one example, predetermined values for each physical parameter may be based on the user's physiological parameters, such as age, gender, or height. To collect the physiological parameters from the user 112, the system 100 may provide the user 112 with a user interface containing text and numerical fields for the user to fill in. Information provided by the user 112 is then stored in a memory of the user device 110. The controller 102 may then retrieve the predetermined values from a look-up table to match the physiological parameters of the user with corresponding predetermined values of the physical parameters.

Figure 2:
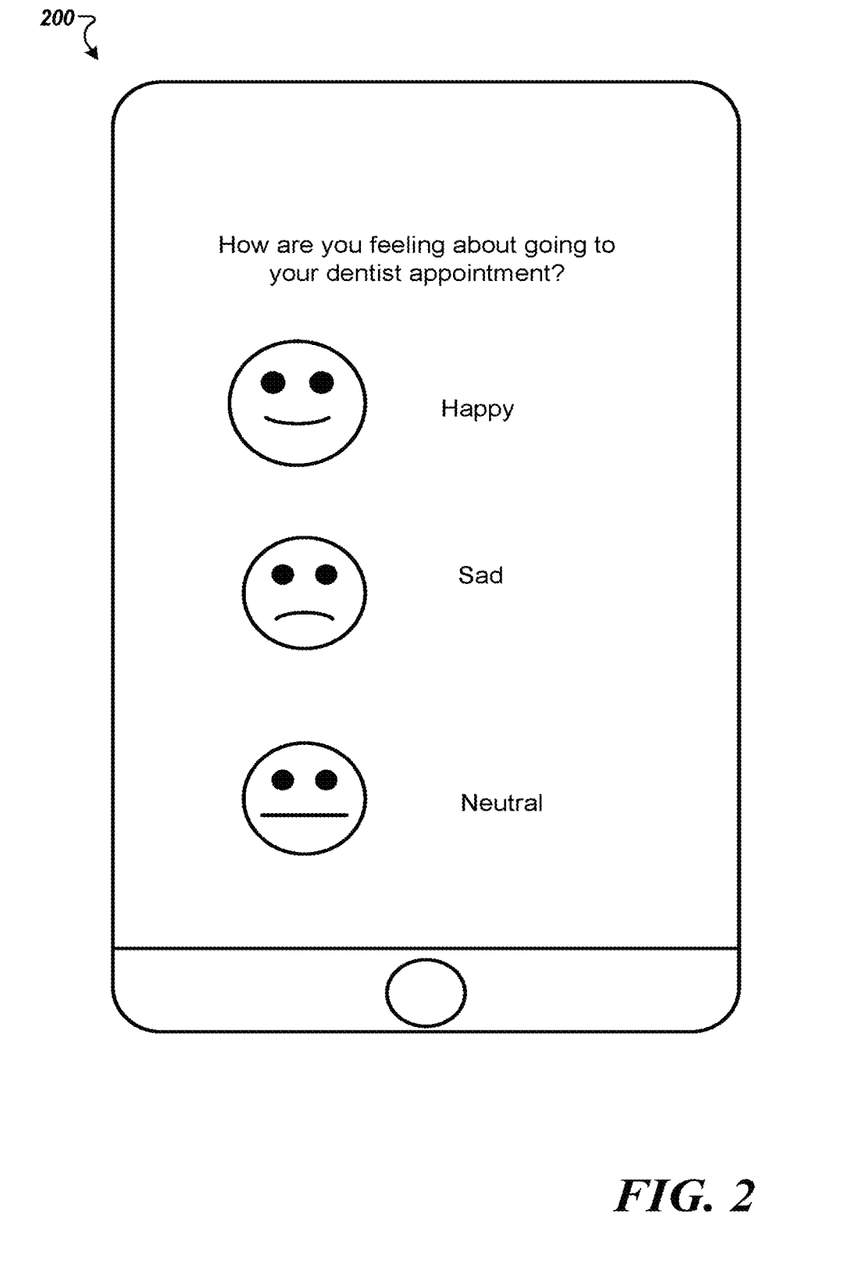
FIG. 2 is a schematic that shows a user interface for acquiring the emotional state of the user according to one example.

FIG. 2 is a schematic that shows a user interface 200 for inputting the user's emotions according to one example. The user interface may be part of a website, web portal, personal computer application, or mobile device application configured to allow the user 112 to interact with the controller 102. In one aspect, the controller 102 may provide the user 112 with at least one question. The controller 102 may provide the user with a list of answers to select from. The controller 102 may determine the emotional state and the associated stress level based on the user input. In addition, the controller 102 may present the user with questions about their destination to determine an emotional state associated with the destination. For example, the controller 102 may output "you have a job interview at your destination, how you are feeling about it?" Then, the controller 102 may determine the emotional state based on the user input. The destination of the user may be determined automatically from the electronic calendar 116 associated with the user 112.

The user destination may be categorized based on a potential stress. For example, a high stress category may include job interviews, work appointments, and medical appointments. A low stress category may include shopping, recreational activities, theater, and the like. Thus, the controller 102 may determine the emotional state of the user based on the user destination category. The user destination categories may be preset and/or may be set and modified by the user. Other factors may include availability of parking at the destination.

As described previously herein the emotional state may be based on a plurality of factors. A weighted formula may be used to determine the emotional state based on the plurality of factors described herein or other factors. The weight of each factor may be preset. The weighted formula may be expressed as:

$$\text{Emotional state} = (factor_1 \times weight_1) + \\ (factor_2 \times weight_2) + \ldots + \\ (factor_n \times weight_n) \\ = \sum_{i=1}^{n} factor_i \times weight_i \qquad (1)$$

where n is the number of factors. The controller 102 may calculate the stress level using equation (1). A first factor may represent the heart rate and have a weight of 0.2. A second factor may represent the respiration rate. The controller 102 may use a look-up table to determine the weight of each factor.

As described previously herein, the user destination and desired arrival time may be determined based on a user input and/or user's electronic calendar 116. The controller 102 provides the user with a route plan based on the user's emotional state. The route plan may include a navigation plan and/or a suggested departure time.

The system 100 takes into account actual navigation data, such as delays, duration of travel at specific times and days of the week, temporary construction, sports events, accidents, and the like. The navigation data may be downloaded from the route data database 108. Downloading can be by wireless networks or connection to a wired network, such as a Universal Serial Bus (USB) connection to the user device 110 which is connected to the Internet.

Figure 3:
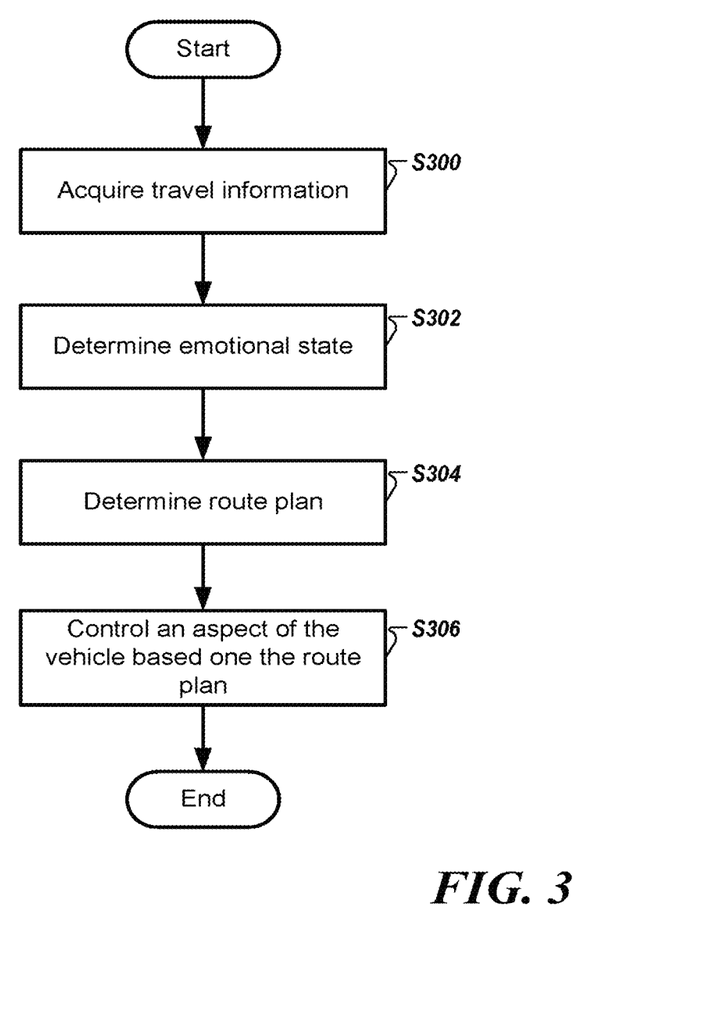
FIG. 3 is a flowchart illustrating a method for generating a route plan according to one example.

FIG. 3 is a flowchart illustrating a method for generating a route plan according to one example. At step S300, the controller 102 may acquire travel information. The travel information may include a user destination and/or a desired arrival time. For example, the controller 102 may automatically retrieve the user destination and/or the desired arrival time by checking the electronic calendar 116 associated with the user 112. The electronic calendar 116 may be retrieved from a user device associated with the user via the network 114. In certain aspects, the controller 102 may provide the user 112 with an interface to input the travel information.

In addition, the travel information may include a starting location. The starting location may correspond to a geographic location of the user 112. The geographic location of the user 112 may be determined by a plurality of methods. For example, the geographic location may also correspond with the user device 110. That is, once the user device 110 location is determined by any of the techniques described herein or other methods as known in the art, the user's location is also likely established. The user device's 110 location can be determined via various satellite-based positioning systems known in the art, such as GPS (Global Positioning System). For example, the user device 110 may include a location detector. The location detector may be a GPS module for detecting a current geographical location of the user device 110. The user device's 110 location can be determined via a cellular tower with which communication has been established using current technology such as GMS (Global System for Mobile) localization, triangulation, Bluetooth, hotspots, WiFi detection, or other methods as would be understood by one of ordinary skill in the art. The user device's 110 location can also be determined by the network 114. In particular, the controller 102 may detect a location of the user device 110 as a network address on the network 114.

At step S302, the controller 102 may determine an emotional state associated with the user. As described previously herein, the controller 102 may poll the one or more sensors 104 to obtain readings associated with one or more physical parameters. In addition, the controller 102 may provide one or more questions to determine the emotional state based on the self-ratings of the user 112.

The emotional state may include the emotional state of a passenger in addition to the emotional state of the driver (user). For example, when a family is traveling, the emotional state of each individual may be included in determining the emotional state.

At step S304, the controller 102 determines the route plan based on at least the emotional state of the user. In addition, the controller 102 may poll the route data database 108 to obtain traffic and route information via the network 114. Further, the controller 102 may obtain weather information via the network 114. Then, the controller 102 may determine the route plan based on the stress level indicated by the emotional state. In one example, the controller 102 may modify one or more parameters of a conventional route plan (e.g., determined via a conventional route planner such as google).

In one example, the emotional state of the user may be associated with a stress level (e.g., scale from one to ten). Each level may be associated with a predetermined stress reducing action. For example, a level of ten may be associated with adding 30 minutes to the normal duration of the trip. In another example, the level may be associated with adding a predetermined percentage to the normal duration of the trip (e.g., adding ten percent of the trip normal duration when the stress level is five). For example, the route planner may determine that the driving time from location A to location B is forty minutes. Then, the controller 102 may add four minutes to the driving time in response to determining that the stress level of the user is five. Thus, the suggested departure time may be four minutes earlier than when the user 112 is not stressed.

A number of stress reducing actions may be classified in a stress hierarchy according to the potential reduction in the stress level. The stress reducing actions may include avoiding left turns, avoiding highway merger, avoiding unfamiliar routes (i.e., selecting familiar route segments), avoiding difficult roadway configurations, selecting a scenic route, avoiding use defined geographic areas, and the like. The controller 102 may also modify a combination of an earlier departure time and one or more changes in the route plan. For example, the controller 102 may avoid highways, output a route that uses segments familiar to the user, output a route with a minimal amount of turns, and recommend a ten minutes earlier departure time. For example, route A may be shorter than route B but route A may include many route segments which require many turns while route B may be more straightforward. Thus, when the user has a high level of stress (e.g., higher than a normal average), the controller 102 may select route B. The changes may be applied based on the user preference. For example, upon initial use of the system 100 the user may be provided with a questionnaire to determine action/events that may increase/decrease stress level.

The action/events that may increase/decrease the stress level of the user may be determined based on a history of the user. For example, the controller 102 may monitor one or more physical parameters of the user 112 while driving to determine the actions that induce stress. The controller 102 may store each action/event that induces stress in the memory. Then, the controller 102 avoids the actions that induce stress when generating the route plan when the user is stressed.

At step S306, the controller 102 may output the route plan determined at step S304 to the user 112. In one aspect, the user 112 may be provided with an option to accept the route plan or to request an updated route plan based on a new input from the user 112. The new input may include an indication of a change in the emotional state, a preference to a different route, and the like. Further, the controller 102 may control one aspect of the vehicle based on the route plan. For example, the controller 102 may change the settings of the navigation control, climate control, audio control, or climate control to reduce stress. The controller 102 may select an audio program that includes anxiolytic music. The controller 102 may activate a pre-set profile for the climate control that helps alleviate stress of the driver. In addition, the controller 102 may change the settings of the navigation control to help reduce the stress of the driver (e.g., outputting navigational directions at a higher frequency, repeating the navigational directions two or more times). Further, the controller 102 may control setting of advance driver assistance systems to reduce the stress of the driver (e.g., brake assist, activating cruise control, activating parking sensors).

Figure 4:
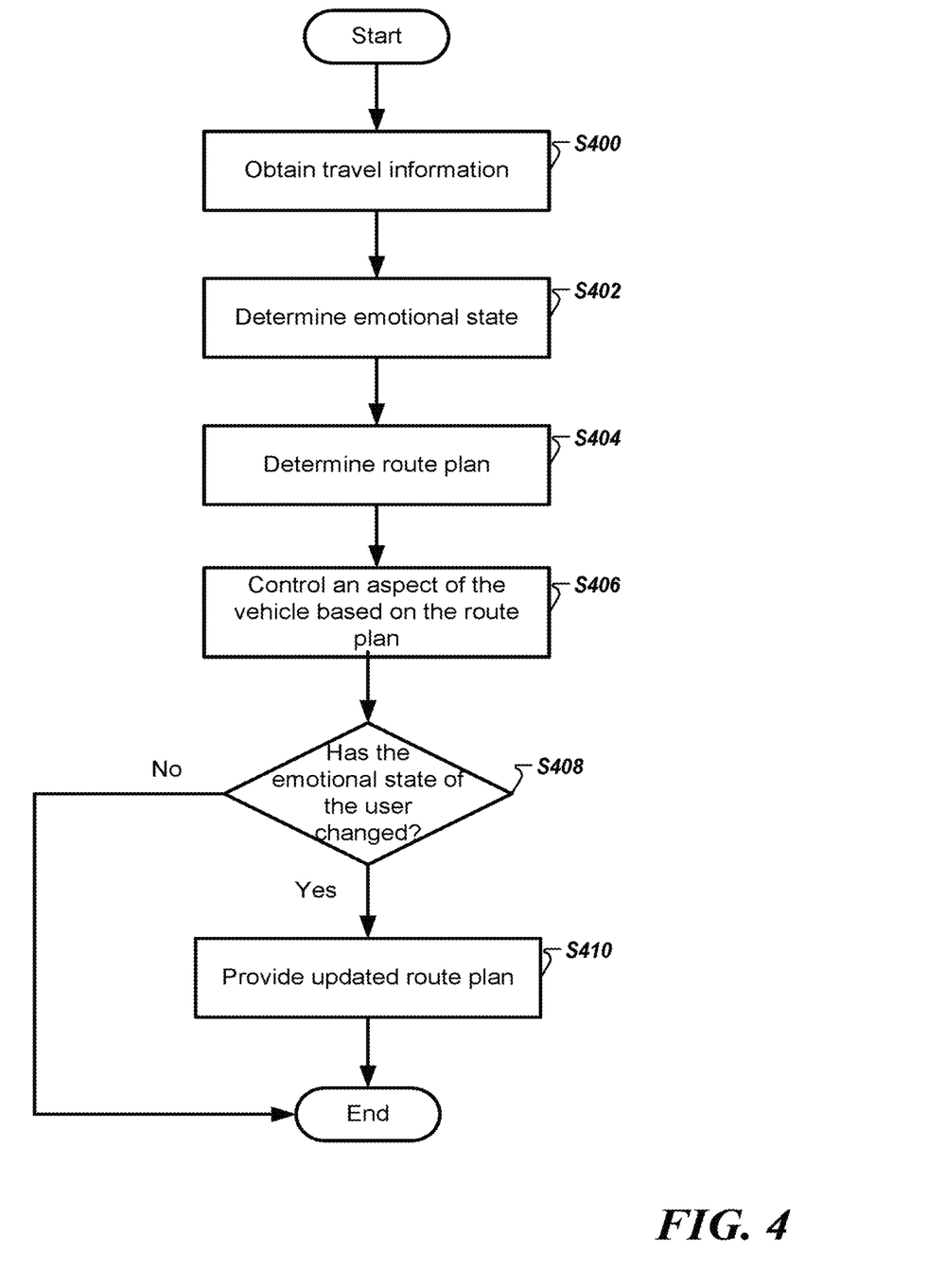
FIG. 4 is a flowchart illustrating a method for modifying a route plan according to one example.

FIG. 4 is a flowchart illustrating a method for generating a route plan according to one example. At step S400, the controller 102 may acquire travel information. The travel information may include a user destination and/or a desired arrival time. For example, the controller 102 may automatically retrieve the user destination and/or the desired arrival time by checking the electronic calendar 116 associated with the user 112.

At step S402, the controller 102 may determine an emotional state associated with the user. As described previously herein, the controller 102 may poll the one or more sensors 104 to obtain readings associated with one or more physical parameters. In addition, the controller may adjust the emotional state based on the destination (e.g., job interview, shopping, medical appointment) as described previously herein.

At step S404, the controller 102 determines the route plan based on at least the emotional state of the user 112. Thus, the controller 102 alters at least one parameter in the route plan so as to decrease the stress level of the user 112 as described previously herein.

At step S406, the controller 102 may output the route plan determined at step S404 to the user 112. At step S408, the controller 102 may determine whether there is a change in the user's emotional state. For example, the controller 102 may poll the one or more sensors 104 to obtain information in real time during the trip. In addition, the emotional state of the user may change between when the user first uses the system 100 and the time of departure. Thus, the controller 102 may monitor the emotional state of the user 112 prior to the recommended departure time. For example, the controller 102 may determine that the user may leave after one hour to reach the destination at the desired arrival time. Then, the controller 102 may continue to monitor the emotional state of the user 112 by polling the one or more sensors 104 to obtain updated measurements. The controller 102 may determine an updated emotional state to check whether there is a change in the emotional state of the user. In response to determining that there is no change in the user's emotional state, the process may end or go back to monitoring the user. In response to determining that there is a change in the user's emotional state, the process goes to step S410.

At step S410, the controller 102 may generate an updated trip plan based on the new emotional state of the user. Then, the controller 102 may provide the user with the updated trip plan. For example, when the user is more stressed the controller 102 may provide the user with a new recommended departure time earlier than the previously recommended time. In contrast, if the user is less stressed then the user may update the recommended departure time to a later time than previously scheduled.

The controller 102 may output a notification to the user in response to generating an updated route plan. For example, the notification may be as flashing information on the display of the user device 110, as a voice or speech message, as vibration, or the like.

Figure 5:
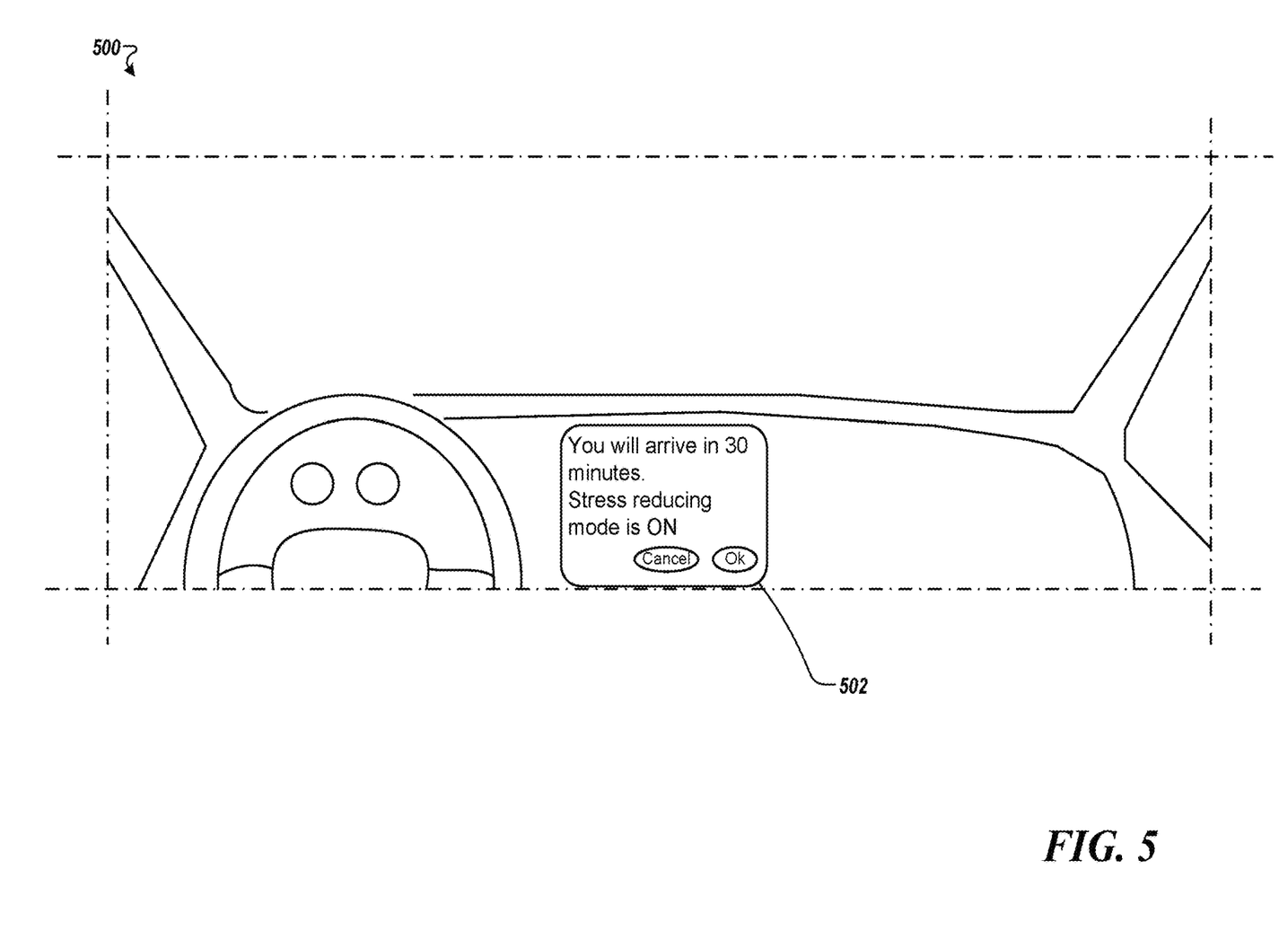
FIG. 5 is a schematic that shows a user interface display according to one example.

FIG. 5 is a schematic 500 that shows a display 502 of a navigation system according to one example. The display 502 may show an estimate arrival time for the user. In addition, the display 502 may show an indication to whether the system 100 is applying one or more actions to reduce the stress of the user 112. For example, the controller 112 may output "Stress reducing mode is ON" to indicate that the system 100 is applying one or more stress reducing actions.

Next, a hardware description of the controller 102 according to exemplary embodiments is described. The controller 102 includes a CPU which performs the processes described herein and the process data and instructions may be stored in memory. These processes and instructions may also be stored on a storage medium disk such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the controller communicates, such as a server or computer.

Further, the claimed advancements may be provided as a utility application, background daemon, or component of an operating system, or combination thereof, executing in conjunction with CPU and an operating system such as Microsoft Windows, UNIX, Solaris, LINUX, Apple MAC-OS and other systems known to those skilled in the art.

In order to achieve the controller 102, the hardware elements may be realized by various circuitry elements, known to those skilled in the art. For example, CPU may be a Xenon or Core processor from Intel of America or an Opteron processor from AMID of America, or may be other processor types that would be recognized by one of ordinary skill in the art. Alternatively, the CPU may be implemented on an FPGA, ASIC, PLD or using discrete logic circuits, as one of ordinary skill in the art would recognize. Further, CPU may be implemented as multiple processors cooperatively working in parallel to perform the instructions of the inventive processes described above.

The controller 102 can also include a network controller, such as an Intel Ethernet PRO network interface card from Intel Corporation of America, for interfacing with network. As can be appreciated, the network can be a public network, such as the Internet, or a private network such as LAN or WAN network, or any combination thereof and can also include PSTN or ISDN sub-networks. The network can be wireless such as a cellular network including EDGE, 3G and 4G wireless cellular systems. The wireless network can also be WiFi, Bluetooth, or any other wireless form of communication that is known.

The controller 102 further includes a display controller, such as a NVIDIA GeForce GTX, TEGRA, TITAN X, Quadro graphics adaptor from NVIDIA Corporation of America for interfacing with display 502, or other graphics processing unit (GPU) as would be understood be one of ordinary skill in the art. The controller 102 may include a NVIDIA DRIVE PX 2 or DRIVE CX.

A general purpose I/O interface interfaces with the user interface 106.

A description of the general features and functionality of the display, as well as the display controller, storage controller, network controller, and general purpose I/O interface is omitted herein for brevity as these features are known.

A data processing system may be configured to perform the algorithms shown in FIGS. 3 and 4. The data processing system may include one or more processors and/or one or more heterogeneous processor systems.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such a LAN or WAN, or may be a public network, such as the Internet. Input to the system may be received via direct user input and received remotely in real-time. Additionally, some implementations may be performed on modules or hardware not identical to those described. Accordingly, other implementations are within the scope that may be claimed.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for route planning of a vehicle, the method comprising:
acquiring, using processing circuitry, travel information, the travel information including a user destination;
determining, using the processing circuitry, an emotional state of a user based on a plurality of factors;
determining, using the processing circuitry, a route plan for the vehicle based on the user destination and the emotional state of the user; and
controlling an aspect of the vehicle based on the route plan, the aspect including at least a climate control setting of the vehicle,
wherein the emotional state is determined as a weighted sum of the plurality of factors according to:

$$\text{Emotional state} = (\text{factor}_1 \times \text{weight}_1) + (\text{factor}_2 \times \text{weight}_2) + \ldots + (\text{factor}_n \times \text{weight}_n)$$

where n is a number of the plurality of factors, and $\text{weight}_{1 \ldots n}$ is a multiplier for each $\text{factor}_{1 \ldots n}$, at least one weight being less than 1, and the $\text{weight}_{1 \ldots n}$ are retrieved from a look-up table.

2. The method of claim 1, wherein the step of determining the emotional state of the user includes acquiring at least one physical parameter from one or more sensors and/or self-reported feelings of stress.

3. The method of claim 2, wherein the at least one physical parameter includes at least one of systolic blood pressure, diastolic blood pressure, pulse, heart rate, cardiac minute volume, vascular resistance, respiratory volume, respiratory rate, body temperature, skin temperature, blood adrenalin level, blood cortisol level, blood noradrenalin level, blood glucose level, transpiration volume, amount of hand sweat exuded, electrical conductivity of the skin, eye movement, dilated nostrils, lip pursing, muscular tension, body movement, speech volume, voice strength, facial expression, and/or pupil size.

4. The method of claim 1, wherein the route plan includes at least one of a recommended departure time and navigational directions.

5. The method of claim 1, wherein the route plan includes applying one or more stress reducing actions.

6. The method of claim 5, wherein the one or more stress reducing actions include one or more of adjusting a departure time to an earlier departure time, avoiding highways, avoiding difficult roadway configurations, avoiding left turns, selecting a scenic route, avoiding user defined geographic areas, and selecting familiar route segments.

7. The method of claim 5, wherein the one or more stress reducing actions are based on the user's past history.

8. The method of claim 1, further comprising:
monitoring the emotional state of the user;
adaptively modifying the route plan based on the emotional state; and
providing the modified route plan to the user.

9. The method of claim 1, wherein the plurality of factors includes a destination category, a user's self-rating, and a stress level.

10. The method of claim 1, wherein the user destination is determined using an electronic calendar associated with the user.

11. The method of claim 1, wherein the aspect of the vehicle further includes at least one of navigation control or audio control.

12. A system for route planning of a vehicle, the system comprising:
one or more sensors; and
processing circuitry configured to
acquire travel infoiliiation, the travel information including a user destination,
determine an emotional state of a user based on a plurality of factors, the plurality of factors including readings from the one or more sensors,
determine a route plan for the vehicle based on the user destination and the emotional state of the user, and
control an aspect of the vehicle based on the route plan, the aspect including at least a climate control setting of the vehicle,
wherein the emotional state is determined as a weighted sum of the plurality of factors according to:

$$\text{Emotional state} = (\text{factor}_1 \times \text{weight}_1) + (\text{factor}_2 \times \text{weight}_2) + \ldots + (\text{factor}_n \times \text{weight}_n)$$

where n is a number of the plurality of factors, and $\text{weight}_{1 \ldots n}$ is a multiplier for each $\text{factor}_{1 \ldots n}$, at least one weight being less than 1, and the $\text{weight}_{1 \ldots n}$ are retrieved from a look-up table.

13. The system of claim 12, wherein the readings from the one or more sensors include at least one of at least one physical parameter include at least one of systolic blood pressure, diastolic blood pressure, pulse, heart rate, cardiac minute volume, vascular resistance, respiratory volume, respiratory rate, body temperature, skin temperature, blood adrenalin level, blood cortisol level, blood noradrenalin level, blood glucose level, transpiration volume, amount of hand sweat exuded, electrical conductivity of the skin, eye movement, dilated nostrils, lip pursing, muscular tension, body movement, speech volume, voice strength, facial expression, and/or pupil size.

14. The system of claim 12, wherein the route plan includes at least one of a recommended departure time and navigational directions.

15. The system of claim 12, wherein the route plan includes applying one or more stress reducing actions.

16. The system of claim 15, wherein the one or more stress reducing actions include one or more of adjusting a departure time to an earlier departure time, avoiding highways, avoiding difficult roadway configurations, avoiding left turns, selecting a scenic route, avoiding user defined geographic areas, and selecting familiar route segments.

17. The system of claim 12, wherein the processing circuitry is further configured to:
monitor the emotional state of the user;
adaptively modify the route plan based on the emotional state; and
provide the modified route plan to the user.

18. The system of claim 12, wherein the aspect of the vehicle further includes at least one of navigation control or audio control.

19. A non-transitory computer readable medium storing computer-readable instructions therein which when executed by a computer cause the computer to perform a method for providing a route plan, the method comprising:
acquiring travel information, the travel information including a user destination;
determining an emotional state of a user based on a plurality of factors;
determining a route plan for the vehicle based on the user destination and the emotional state of the user; and
controlling an aspect of the vehicle based on the route plan, the aspect including at least a climate control setting of the vehicle,
wherein the emotional state is determined as a weighted sum of the plurality of factors according to:

$$\text{Emotional state} = (\text{factor}_1 \times \text{weight}_1) + (\text{factor}_2 \times \text{weight}_2) + \ldots + (\text{factor}_n \times \text{weight}_n)$$

where n is a number of the plurality of factors, and $\text{weight}_{1 \ldots n}$ is a multiplier for each $\text{factor}_{1 \ldots n}$, at least one weight being less than 1, and the $\text{weight}_{1 \ldots n}$ are retrieved from a look-up table.

* * * * *